(No Model.)

J. E. STURDY.
CRANBERRY GATHERER.

No. 489,239. Patented Jan. 3, 1893.

Witnesses.
Marion E. Brown.
Mary W. Storer.

Inventor.
Joseph E. Sturdy
by his Attorneys
Brown Bros.

UNITED STATES PATENT OFFICE.

JOSEPH E. STURDY, OF YARMOUTH, MASSACHUSETTS.

CRANBERRY-GATHERER.

SPECIFICATION forming part of Letters Patent No. 489,239, dated January 3, 1893.

Application filed December 24, 1891. Serial No. 416,078. (No model.)

*To all whom it may concern:*

Be it known that I, JOSEPH E. STURDY, a citizen of the United States of America, and a resident of the town of Yarmouth, in the county of Barnstable and State of Massachusetts, have invented certain new and useful Improvements in Cranberry-Gatherers, of which the following is a full, clear, and exact description.

This invention relates to apparatus or implements for gathering cranberries the purpose being to provide means for this work which will greatly facilitate the labor, and also improve the quality of the result.

To these ends the invention consists first and essentially in an upwardly open receptacle having a series of separated teeth extended forwardly from its rear edge and the bottom of the receptacle made, between its forward and rear edge-portions, outwardly rounded or convex and so adapted to be supported on the ground, at the base of the vines or plants, and with its said teeth extending by the sides of the plants, under the berries, said rounded or convex bottom enabling the receptacle to be rocked in a direction to swing its said teeth upwardly and thereby secure the stripping of the berries from the plants and their deposit on said teeth to be rolled therefrom into the receptacle.

The invention furthermore consists in a peculiar form of raking device especially designed for positively forcing the cranberries which have been severed from the vines by, and are supported on the extended teeth of the afore mentioned implement, into the receptacle portion thereof.

Figure 1:
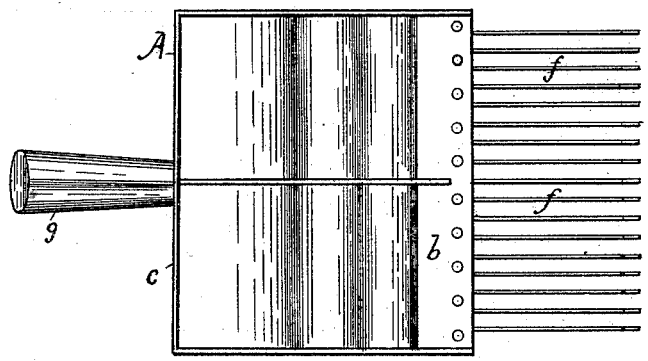
Figure 2:
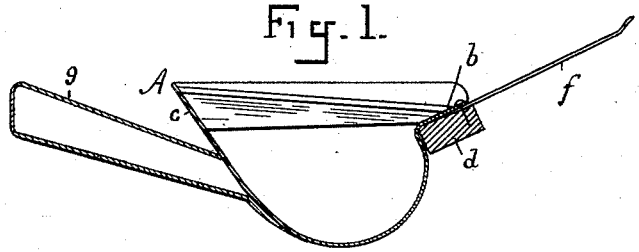
Figure 3:
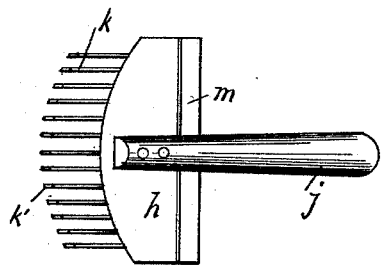
Figure 4:
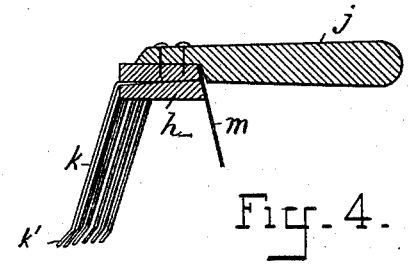
Figure 5:
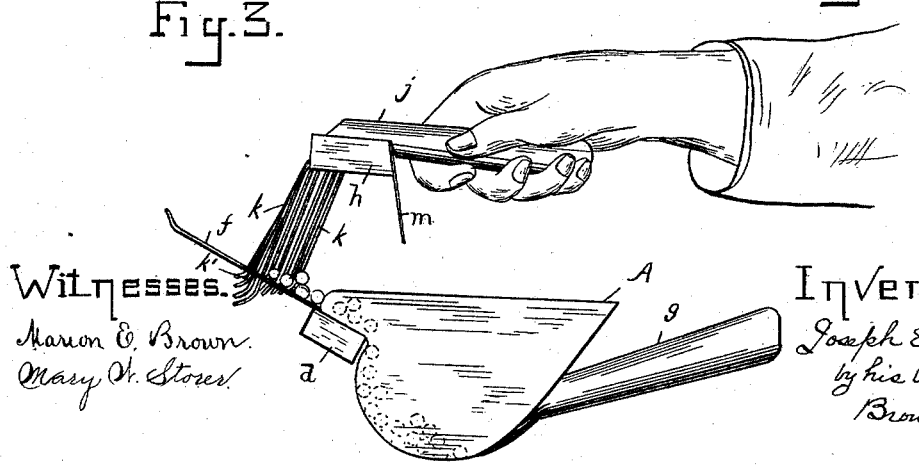

In the accompanying drawings, these implements are illustrated Figures 1 and 2 being respectively a plan and longitudinal vertical section of the cranberry stripping and receiving device, and Figs. 3 and 4 are respectively plan and longitudinal sectional views of the raking device. Fig. 5 is a view showing conjoint employment of both of the implements.

In the drawings A represents the receptacle. The receptacle, preferably, is made of sheet metal, opens upwardly and, between its rear edge portion or wall $c$ and its forward edge portion or wall $a$, is made outwardly rounded or convex, preferably terminating at its rear edge-portion $c$, in a rearward and tangential and upward extension as shown, and at its forward edge-portion $a$ having a forwardly and upwardly extended lip or flange $b$ against which is placed the strip $d$ which clamps and confines the rear extremities of the separated teeth-forming wires or rods $f$ which are thence forwardly and upwardly extended. Nails or other fastening devices secure the confining strip in the described relation. The handle $g$ is connected at, and rearwardly extended from the back of the receptacle.

In practice, the receptacle with its attachments described is placed so as to rest by its outwardly convex or rounded portion or bottom upon the ground, or well down in the bog, and the teeth considerably depressed and extending past the plants below the berries, then depressing the handle the teeth are upwardly swung, the rounded receptacle bottom constituting an efficient, constant, certain and positive fulcrum for the receptacle in all its positions as it is rocked, and the berries are stripped from and carried above the tops of the plants, to thence roll or be raked into the receiver. The implement is then reversely rocked and forwardly slid or forced, and another stripping of berries is effected.

The raking device consists of a bar or head $h$, having rearwardly extended handles $j$ and at its forward edges a series of separated raking teeth $k$ downwardly extended with a forward pitch. The extremities of the teeth are still further forwardly turned as seen at $k'$. The teeth as shown have an arc arrangement corresponding to the concave forward edge of the bar or head. The turned tooth points insure an avoidance, on the raking in of the berries, of the latter being pierced or bruised, and the outer ones of the arc arranged teeth may act as guards against such possible lateral throw of the berries as might carry them outside of the receiving receptacle. $m$ represents a guard plate downwardly extended from the rear of the rake stock which serves to prevent any overshot of the berries over the rear edge of the receiver as they are forcibly raked toward the mouth thereof.

Having thus described my invention, what I claim and desire to secure by Letters Patent is:

1. An implement for gathering cranberries, consisting of a receptacle A which is open on its upper side, and has an outwardly rounded bottom extending from its front to its rear end, so that said receptacle can be rocked on said bottom, in combination with a fixed flange $b$ projecting from the forward edge of the receptacle a series of separated teeth $f$ held on and upwardly and forwardly projected from said flange, and a rearward projected handle $g$ all as described, for the purposes specified.

2. In an apparatus for gathering cranberries, the combination with an upwardly open receptacle having rearwardly projected a handle, and forwardly from its edge a series of separated teeth, of a rake device, consisting of a bar having a handle, a series of teeth and the guard, substantially as and for the purposes set forth.

3. A rake for the purpose substantially as set forth, consisting of a bar having a rearwardly extended handle, and a series of teeth which are downwardly extended from the forward edge of the bar, being arranged in a centrally prominent curve, substantially as described.

4. A rake, for the purpose substantially as set forth, consisting of a bar or head having a handle, and its forward edge convex, a series of teeth downwardly extended from said convex edge, with their extremities forwardly turned and the guard plate downwardly extended from the rear of the bar, substantially as described and shown.

In testimony whereof I have hereunto set my hand in the presence of two subscribing witnesses.

JOSEPH E. STURDY.

Witnesses:
MARION E. BROWN,
MARY W. STORER.